US010651971B2

United States Patent
Zirwas et al.

(10) Patent No.: US 10,651,971 B2
(45) Date of Patent: May 12, 2020

(54) MOBILE COMMUNICATION DEVICE, NETWORK NODE AND COMMUNICATION SYSTEM FOR COORDINATED MULTIPOINT TRANSMISSION COMPRISING SELF-CONTAINMENT INFORMATION OF A CHANNEL-DEPENDENT ATTRIBUTE

(75) Inventors: Wolfgang Zirwas, München (DE); Ottmar Aumann, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 79 days.

(21) Appl. No.: 13/395,679

(22) PCT Filed: Sep. 15, 2009

(86) PCT No.: PCT/EP2009/061920
§ 371 (c)(1),
(2), (4) Date: Apr. 20, 2012

(87) PCT Pub. No.: WO2011/032580
PCT Pub. Date: Mar. 24, 2011

(65) Prior Publication Data
US 2012/0218953 A1    Aug. 30, 2012

(51) Int. Cl.
*H04L 1/00*    (2006.01)
(52) U.S. Cl.
CPC .......... *H04L 1/0028* (2013.01); *H04L 1/0026* (2013.01); *H04L 1/0072* (2013.01)
(58) Field of Classification Search
CPC .... H04L 1/0026; H04L 1/0028; H04L 1/0072
See application file for complete search history.

(56) References Cited

U.S. PATENT DOCUMENTS 8,446,938 B2 *    5/2013    Li ....................... H04L 27/0014
                                                            370/336
2001/0050962 A1 *  12/2001  Adachi ..................... H03F 3/24
                                                            375/264
(Continued)

FOREIGN PATENT DOCUMENTS

WO    WO-2008043817 A1 *  4/2008    ........... H04B 7/0617
WO    WO 2009/088336 A1    7/2009

OTHER PUBLICATIONS

R1-092032, 3GPP TSG RAN WG1 #57, San Francisco, USA May 4-8, 2009, "CQI and CSI Feedback Compression", Alcatel-Lucent, 3 pgs.

(Continued)

*Primary Examiner* — Rina C Pancholi
(74) *Attorney, Agent, or Firm* — Harrington & Smith

(57) ABSTRACT

The present invention provides a mobile communication device including a sending and receiving unit, wherein the sending and receiving unit is adapted for the transmission of a signal pattern over a communication channel, wherein the signal pattern includes at least two logical data units, wherein the signal pattern includes information of information to be transmitted, wherein in a first logical data unit absolute information of information to be transmitted is provided, wherein in at least one second logical data unit relative information of information to be transmitted is provided, wherein the relative information of information to be transmitted is depending at least in part on the absolute information of information to be transmitted and/or a preceding relative information of information to be transmitted, wherein the at least one second logical data unit further includes self-containment information of information to be transmitted.

20 Claims, 9 Drawing Sheets

| full report | tracking report | tracking report | tracking report | tracking report | full report | tracking report | tracking report | tracking report | tracking report | full report |

Coarse (+fine) fountain       Coarse (+fine) fountain

→ time

(56) References Cited

U.S. PATENT DOCUMENTS

| | | | |
|---|---|---|---|
| 2007/0218950 A1* | 9/2007 | Codreanu et al. | 455/562.1 |
| 2008/0080635 A1* | 4/2008 | Hugl et al. | 375/267 |
| 2008/0298486 A1* | 12/2008 | Venturino et al. | 375/260 |
| 2010/0054212 A1* | 3/2010 | Tang | 370/335 |
| 2010/0099364 A1* | 4/2010 | Yang et al. | 455/69 |
| 2010/0226269 A1* | 9/2010 | Chakraborty | H04L 5/0007 370/252 |

OTHER PUBLICATIONS

R1-093109, 3GPP TSG-RAN WG1 #58, Shenzhen, China, Aug. 24-28, 2009, "Feedback in Support of DL CoMP; General Views", Qualcomm Europe, 6 pgs.

* cited by examiner

FIG 3 h11: subframe 1 to 9 →

```
0  0  0  0  0  0  0  0  0
0  0  0  0  0  0  0  0  0
0  0  0  0  0  0  0  0  0
0  0 -1  1 -1  1  0 -1  0
0  0  0  0  0  0  0  0  0
0  0  0  0  0  0  0  0  0
0  0  0  0  0  0  0  0  0
0  0  0  0  0  0  0  0  0
0  0  0  0  0  0  0  0  0
0  0  0  0  0  0  0  0  0
0  0  0  0  0  0  0  0 -1
0  0  0  0  0  0  0  0  0
0  0  0  0  0  0  0  0  0
0  0  0  0  0  0  0 -1  1
0  0  0 -1  1  0  0  0  0
0  0  1 -1  0  1  0 -1  1
0  0  0  1 -1  0  1  0  0
0  0  0  0  0  0  0  0  0
0  0  0  0  0  0  0  0  0
0  0  0  0  0  0  0  0  0
0  0  0  0  0  0  0  0  0
0  0  0  0  0  0  0  0  0
``` h12: subframe 1 to 9 →

```
0  0  1  0  0  0  0  0  0
0  0  1  0  0  0  0  0  0
0  0  1  0  0  0  0  0  0
0  0  0  1  0  0  0  0  0
0  0  0  0  0  0  0  1  0
0  0  0  0  0  0  0  0  0
0  0  0  0  0  1 -1  0  1
0  0  0  0  0  0  0 -1  0
0  0  0  0  0  0  0  0  0
0  0  0  0  0  0  0  0  0
0  0  0  0  0  0  0  0  0
0  0  0  0  0  0  0  0  0
0  0  0  0  0  0  0  0  0
0  1  0  0  0  0  0  0  0
0  0  0  0  0  0  0  0  1
0  0  0  0  0  0  0  0  0
0  0  0  0  0  0  0  0  0
0  0  0  0  0 -1  1  0  0
0  0  0  0  0  0  0  0  0
0  0  0  0  0  1  0  0  0
0  0  0  0  0  1 -1  1  0
0  0  0  0  0  0  0  0  0
```

0: report same PMI again

1st report/2nd report coarse/fine

1st report/2nd report
+ 3rd report coarse/fine 3 2-bit SC reports have same quantization as 2 2-bit coarse/fine reports

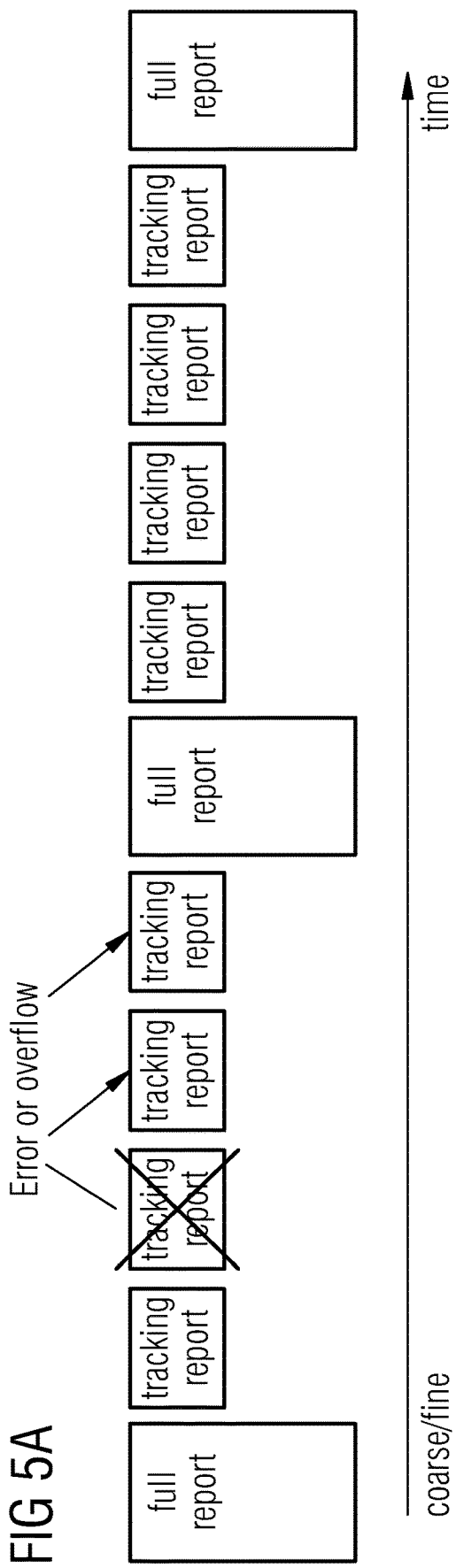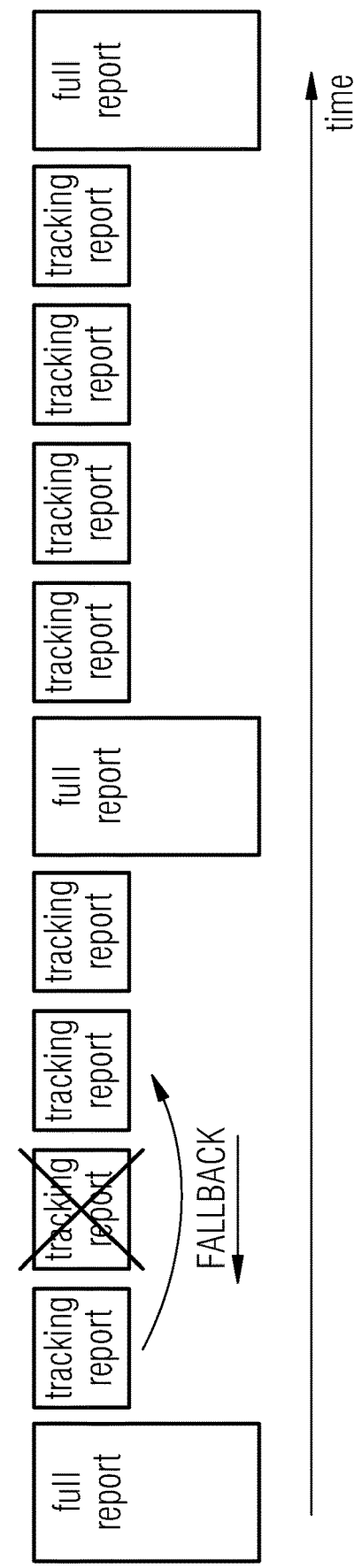

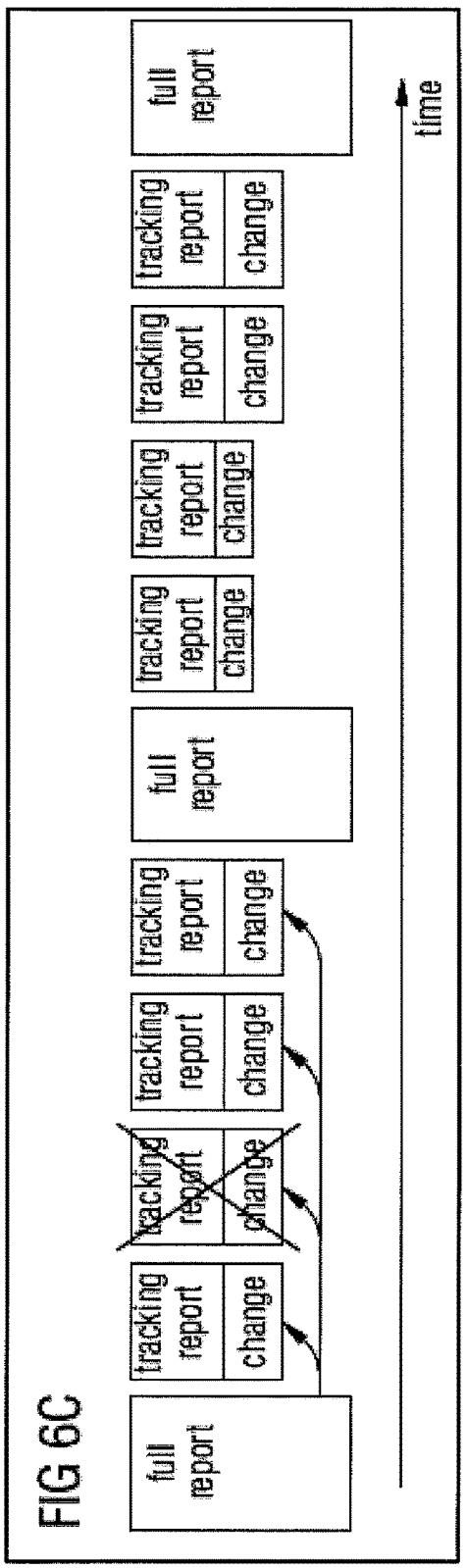
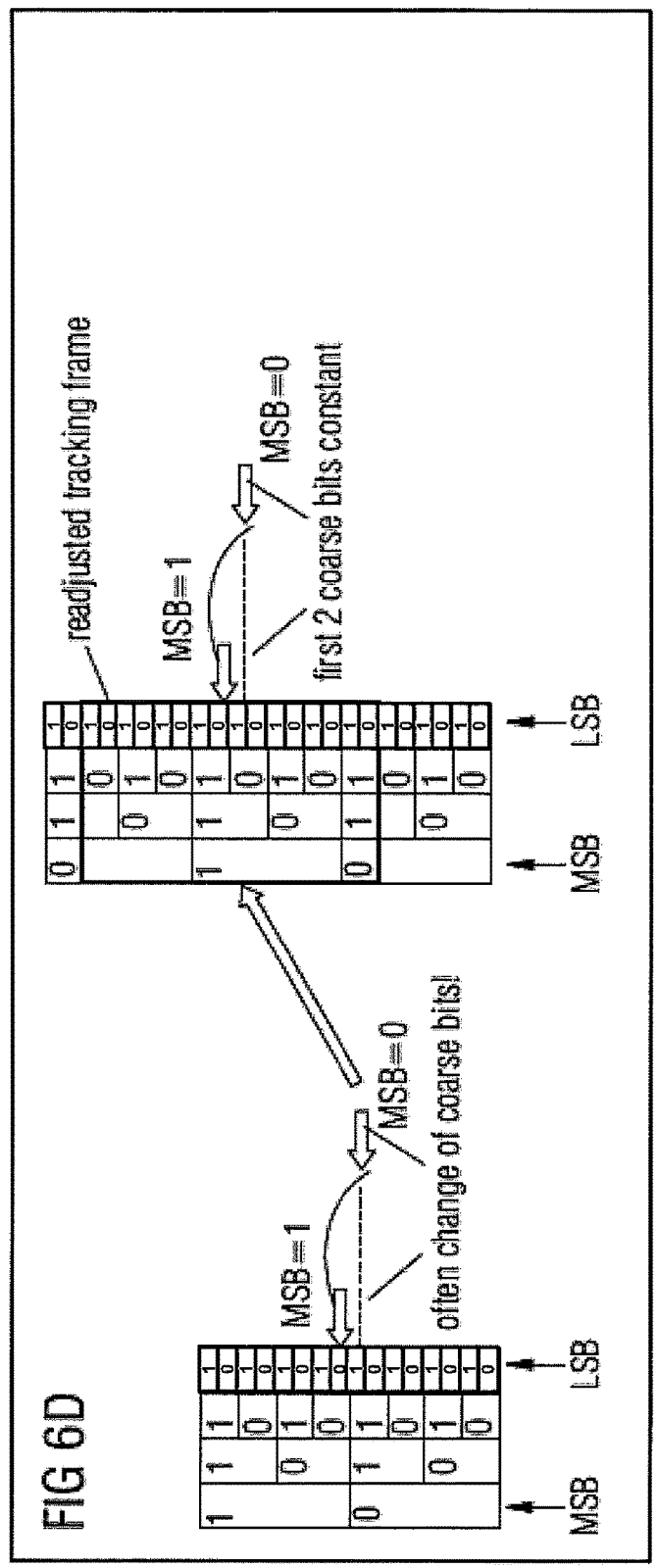

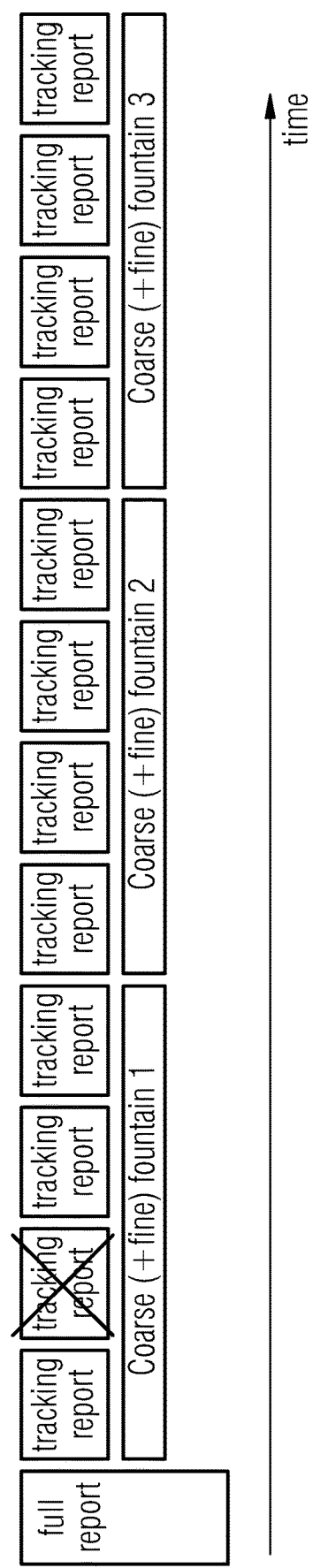

MOBILE COMMUNICATION DEVICE, NETWORK NODE AND COMMUNICATION SYSTEM FOR COORDINATED MULTIPOINT TRANSMISSION COMPRISING SELF-CONTAINMENT INFORMATION OF A CHANNEL-DEPENDENT ATTRIBUTE

TECHNICAL FIELD OF THE INVENTION

The present invention relates to wireless communication in general. More particularly, it relates to a mobile communication device, a network node, a communication system, a method providing channel-dependent information and a method for receiving channel-dependent information.

In particular, it relates to the transmission of self-contained-channel dependent information for coordinated multipoint transmission.

BACKGROUND OF THE INVENTION

In wireless telecommunication systems, channel-dependent information about a communication channel may be beneficial or may even be required for establishing a preferred communication connection between two communication entities.

One communication entity may provide channel-dependent information to the other communication entity for establishing and maintaining a preferred communication connection. Thus, the constant transmission of channel-dependent information, which may be required due to the non-static nature of a wireless communication channel, may be beneficial. In case part of the transmission between the two communication entities has been lost, e.g. due to a temporal communication error, channel-dependent information which may have been incorporated in the lost part of the transmission may be lost as well.

SUMMARY OF THE INVENTION

There may thus be a need to provide not only current channel-dependent information from a first communication entity to a second communication entity but also self-containment information of a channel-dependent attribute, the self-containment information allowing to reconstruct current, up-to-date channel-dependent information and/or channel-dependent information that was provided in a preceding part of the transmission, which preceding part may have not been received by a further communication entity, e.g. due to an erroneous transmission.

Accordingly, a mobile communication device, a network node, a communication system, a method for providing channel-dependent information, a method for receiving channel-dependent information, a computer-readable medium and a program element according to the independent claims are provided.

According to an exemplary embodiment of the present invention a mobile communication device is provided, comprising a sending and receiving unit, wherein the sending and receiving unit is adapted for the transmission of a signal pattern over a communication channel, wherein the signal pattern comprises at least two logical data units, wherein the signal pattern comprises information to be transmitted, wherein in a first logical data unit absolute information of information to be transmitted is provided, wherein in at least one second logical data unit relative information of information to be transmitted is provided and wherein the at least one second logical data unit further comprises self containment information of information to be transmitted.

According to a further exemplary embodiment of the present invention a network node is provided, comprising a sending and receiving unit, wherein the sending and receiving unit is adapted for the transmission of a signal pattern over a communication channel, wherein the signal pattern comprises at least two logical data units, wherein the signal pattern comprises information of a information to be transmitted, wherein in a first logical data unit absolute information of information to be transmitted is provided, wherein in at least one second logical data unit relative information of information to be transmitted is provided and wherein the at least one second logical data unit further comprises self containment information of information to be transmitted.

According to a further exemplary embodiment of the present invention a communication system is provided, comprising at least one mobile communication device according to the present invention and at least one network node according the present invention, wherein the mobile communication device and the network node are operatively coupled for the transmission of a signal pattern.

According to a further exemplary embodiment of the present invention a method for providing channel dependent information is provided, comprising determining, by a determination unit, information to be transmitted of a transmission between a mobile communication device and a network node, generating, by a processing unit, self containment information of the information to be transmitted, and transmitting the self containment information of information to be transmitted by a sending and receiving unit, wherein the self containment information of information to be transmitted is adapted for at least partial reconstruction of at least one information out of the group consisting of information of information to be transmitted, absolute information of information to be transmitted and relative information of information to be transmitted.

According to a further exemplary embodiment of the present invention a method for receiving channel dependent information is provided, comprising receiving, by a sending and receiving unit a logical data unit of a transmission of a signal pattern, the logical data unit comprising at least one information out of the group consisting of absolute information of information to be transmitted, relative information of information to be transmitted and self containment information of information to be transmitted, and reconstructing, by a processing unit, at least a part of the information to be transmitted of the transmission by at least one information out of the group consisting of absolute information of information to be transmitted, relative information of information to be transmitted and self containment information of information to be transmitted.

According to a further exemplary embodiment of the present invention, a computer-readable medium is provided, comprising program code, which program code is adapted, when being executed by a processor, to carry out at least one of the methods for providing channel-dependent information and a method for receiving channel-dependent information.

According to a further exemplary embodiment of the present invention, a program element is provided, comprising a program, which program is adapted, when being executed to carry out the method for providing channel-dependent information or the method for receiving channel-dependent information.

In wireless communication scenarios, e.g. like Long Term Evolution or Long Term Evolution Advanced, so-called coordinated multi-point transmissions (CoMP) may allow to overcome inter-cell interference limitations. Significant performance gains may be achieved when employing so-called joint precoding solutions. Accordingly, precoded data may be transmitted between a plurality of network nodes simultaneously to a plurality of mobile communication devices. It is to be noted, that in this context transmitting may refer to both sending and receiving of an information or transmission.

Preferred performance may be achievable in case of a full network wide cooperation, consequently requiring channel estimation between all network nodes and all mobile communication devices. The information about the channel estimation may thus have to be provided from all mobile communication devices to all network nodes, possibly including multi-casting of communication data from all mobile communication devices to all network nodes of the communication network, in particular in frequency division duplexing.

Due to a limited transmission range in wireless communication systems, it may be sufficient to limit cooperation of network nodes to a plurality of adjacent cells. An according plurality of communication cells employing only a subgroup of network nodes or cells of a communication network may be referred to as a cooperation area (CA).

In a cooperation area, one dedicated network node may constitute a central unit for that cooperation area, which central unit may provide pre-processing and precoding within the cooperation area, subsequently providing precoded transmission signals to all other network nodes of the cooperation area. An according scenario may require that channel-dependent information, e.g. channel state information (CSI), of all network nodes is sent to the central unit (CU) with pre-processed data being sent back from the central unit to the network nodes of the cooperation area.

Thus, the channel estimation for the radio channels of the cooperation area and the reporting of the channel estimate to the network nodes, in particular the central unit, may be considered relevant. It may be in particular beneficial to provide the reporting with low overhead while still providing precoding with sufficient accuracy.

A further enhancement may be the implementation of so-called distributed cooperation areas. In a distributed cooperation area a central unit may not be present. Rather, all network nodes associated to the cooperation area may receive channel-dependent information, like channel state information, from all mobile communication devices associated with the cooperation area, e.g. by a multi-cast message. An according distribution of channel-dependent information by multi-cast messages may further reduce delays which would occur in case channel-dependent information is provided from the central unit to the further network nodes of the cooperation area e.g. by the backbone of the communication network to which all network nodes are connected.

Accordingly, while cooperating mobile communication devices providing multi-cast messages of channel-dependent information may occur in particular with cells having strong interference, thus having a preferred radio channel also in uplink direction, the multi-cast messages may not be received by all network nodes of the cooperation area. A message that was not received by a network node may in particular be referred to as a missed channel-dependent information or a missed channel state information report. Thus, error correction schemes being able to overcome communication limitations in case of a missed report may be beneficial.

One aspect of the present invention may be seen as providing a robust reporting scheme having low overhead, in particular for coordinated multipoint transmission, LTE transmissions like e.g. LTE advanced multi-user multiple input multiple output or LTE advanced single user multiple input multiple output transmissions.

In coordinated multipoint transmission systems mutual interference nulls between the antennas of a plurality of mobile communication devices for obtaining a preferred communication between the mobile communication devices and the network nodes to which the mobile communication devices are associated, may have to be provided. Due to its mobility, mobile communication devices may be considered to move out of interference nulls quite regularly. Accordingly, coordinated multipoint transmission schemes, like e.g. joint precoding (JP), may be in particular sensitive to outdating of channel-dependent information or CSI outdating, meaning that dedicated channel dependent information may not reflect the current situation anymore.

Accordingly, joint precoding may in particular be beneficial for low mobility scenarios in which mobile communication devices may exhibit only a minor movement speed. In low mobility scenarios, long correlation times for radio channels of a coordinated multipoint transmission system may be achievable.

Thus, for a reduction in data size when providing channel-dependent information, a full report may be provided over the communication channel from a mobile communication device to a network node or all network nodes of the cooperation area comprising in particular substantially complete and detailed, highly accurate channel-dependent information or channel state information, with subsequent reports being provided as relative reports comprising changes relative to the full, absolute report.

An according scheme may be referred to as a tracking mode or delta reporting scheme. In particular, in the case of slowly varying radio channels, e.g. in case of a low mobility scenario, no or only minor changes, thus relative information, compared to the full absolute report may have to be reported. An according relative tracking report may be provided with a reduced number of bits, compared to the amount of data of a full, absolute report. In case of an Orthogonal Frequency Division Multiplexing (OFDM) system, e.g. 3GPP LTE Release 8, it may be conceivable to employ a single bit per one subcarrier (SC) or a plurality of subcarriers, per physical resource block (PRB) or subband.

In case of delta reporting, error propagation may have to be considered. Error propagation may occur, e.g. in the case that one tracking report or delta report has not been received, thus the following tracking reports may be considered to be errorous or at least unreliable as the receiving unit may consider the delta report referring to a previous report, assuming a report situation that may have been changed by the missed report.

Thus, the receiving unit may consider the so received report to depend on a previous report without the knowledge that the received report indeed does not refer to the report previously received by rather a missed report. An according situation may be considered as a mobile communication device and a network node getting out of sync with regard to the current bases of a delta report. In particular, in situations with tracking periods comprising multiple tracking reports that may base on the respective preceding report, a communication system may be considered to be very sensitive to feedback errors, i.e. missed reports due to an error in the communication.

Tracking schemes employing only a few bits or even only a single bit may employ this single bit to reflect changes only. Thus, the two bit states "0" and "1" may reflect "+" and "−" values for the feedback value without the possibility to signal "no change". In an according scenario, an overflow may occur, possibly leading to error propagation and unreliable overall feedback. An overflow may occur in case a channel varies to an extent that may not be signalled by an availably number of bits of a tracking report. In particular, a change of the channel condition may have to be reported, which would require tracking data to be reported that is larger that the available tracking bits.

In case a tracking scheme only uses feedback values that inherently reflect a change without the possibility to transmit a "no change" value, in case of a single report being lost, the succeeding report may be considered to always refer to a faulty preceding feedback value, since the missed report may not be considered.

In case a tracking scheme employs codebooks, it may occur that codebook entries leading to preferred performance of a communication connection for two subsequent reports may not be situated adjacent to one another in the codebook. Thus, a minor change in the channel condition may lead to an arbitrary new codebook entry, possibly completely different to the previous one, which may require relative information for which there may not be sufficient reporting capacity in a relative report to transmit or signal an according change.

Though it may be possible to adapt the codebook itself so that lowest indices of the codebook may lead to delta reports requiring only an amount of data that may be conveyed in a single relative report, however this may lead to a rather continuous adaptation of the codebook itself. In case of codebook adaptation, a possible tracking error due to a missed report may be considered to be even more severe due to, in case of a tracking error, the actual codebook of the mobile communication device and the network node being out of sync.

Consequently, a reporting scheme may comprise, at least partly, self-contained feedback reports. Self-contained feedback reports may allow to reconstruct full, substantially complete channel-dependent information from one single report alone. However, this may lead to an increase in reporting size, possibly up to a situation where a full report and a self-contained feedback report substantially comprise identical amount of data.

Also, in low varying radio channels, the repetition of identical reports for several times may occur. Thus, the accuracy of the channel-dependent information known to e.g. the network node may still be limited despite an increased feedback overhead, possibly using the feedback channel in a non-efficient way.

To avoid prolonged periods in which only errorous feedback of channel-dependent information is provided, intermittent full reports with a defined reporting period may be provided, so that the communication system may recover from errorous feedback at least as soon as the next full report is received. However, for long tracking periods and large block error target rates of the feedback link, the performance may be diminished nonetheless.

While providing a full report may stabilize a feedback system, achievable tracking gains may decrease in case the occurrence of full reports increase. For reducing error probability of the feedback reports, robust transmission modes comprising an increased redundancy may be employed. However, again this may lead to an increase in overall reporting overhead, again limiting possible gains in case a delta reporting scheme is employed. Thus, larger tracking periods may require more robust tracking reports with increased redundancy per report while shorter tracking periods may lead to an increased overhead due to the transmission of full reports. This holds in particular true, since in mobile communication systems, a completely error-free transmission may not be achievable. E.g., a change in the block error target rate from 10% to 1%, thus by factor 10, an achievable feedback rate per subcarrier may be reduced from 0.45 bits per subcarrier to 0.24 bits per subcarrier, thus the feedback rate is almost halved. An according system may assume 144 symbols per physical resource block as well as an nCRC of 8.

With regard to an overflow situation for tracking reports, Adaptive Delta Modulation (ADM) may be employed. With adaptive delta modulation, there may be an indication when to increase or reduce a defined value by a preset step size. The increase or reduction may be indicated by a single bit being either "0" or "1". In case the current step size may be too small to follow the channel variation, two successive reports may indicate the same value. Thus, an increase or a decrease is indicated for two consecutive times receiving an identical bit value.

In this case, it may be indicative that too small a step size is currently employed, which may result in a predefined increase in step size both in the sending unit and the receiving unit for the following feedback bit, otherwise the step size is decreased. Thus, the step size or quantization level may be considered to be continuously changing in a predefined way known to both the mobile communication device and the network node.

An overflow situation is preferably addressed by adaptive delta modulation, however error propagation, thus missed tracking reports, may lead to the step sizes being out of sync between the mobile communication device and the network node.

For data, Automatic Repeat reQuest (ARQ) or hybrid Automatic Repeat reQuest (HARQ) schemes may be employed. An according scheme provides increased redundancy being sent for the data allowing for error-free demodulation even in case of an errorous transmission or a missed tracking report. However, due to the changing of the channel-dependent information, it may be preferred to provide current channel-dependent information rather than repeating a lost report, possibly comprising outdated channel-dependent information.

Thus, it may be beneficial to provide self-contained reports, in particular self-contained reports which allow to recover at least part of the channel-dependent information for each report, either full report or tracking report. In particular, it may be beneficial to allow reconstruction of coarse channel-dependent information or coarse channel state information, which may provide accurate, full channel-dependent information in case all reports have been received.

In case some reports are missed, the channel-dependent information may not be completely false or irrelevant, but the accuracy of the channel-dependent information may only degrade to a certain extent. Moreover, the degradation may only occur for a limited number of reports after a missed report, thus the system may be able to recover from a missed report, either by receiving a full report with accurate channel-dependent information or by receiving successive coarse channel-dependent information also resulting in increased accuracy of the channel-dependent information or the channel state information. An according scheme may be seen as reports containing coarse channel-dependent information with adding additional channel-dependent information with increased accuracy, preferably without additional overhead being generated.

In the following, different schemes are presented providing self-containment.

One possibility may be providing fully self-contained reports in combination with increasing channel-dependent information accuracy per report.

Each report may generate a coarse channel-dependent information report, e.g. by transmitting one or two bits per report as a self-contained part. A network node may perform precoding based solely on the coarse channel-dependent information, however with decreased accuracy. In case further or more additional self-contained reports are received, the combination of all reports received may increase the accuracy of the channel-dependent information or the channel state information accuracy. An according reporting scheme may e.g. employ Sigma-Delta Modulation (SDM) to generate a sequence of bits from an input sequence of bits so that the generated sequence of bits provides an estimate of the n most significant bits of the input sequence.

A further possibility may be seen as providing full reports only, however not with a fixed reporting period but rather with an adaptive reporting period. This scheme may be seen as providing only full reports of channel-dependent information at varying time intervals. Time correlation of a possibly invariant or only slightly varying communication channel may be exploited by adapting, thus changing, the reporting period in accordance with the channel variations.

Different parts of a frequency band may vary with different speed. E.g., depending on relative power of the subcarriers, there may be a factor of 100 between high and low power subcarriers regarding phase and amplitude changes over time. Reduced size reports with different reporting periods may be conceivable as well. Possibly, small size reports depending on relative power of subcarriers with an according adaptation of the reporting period may be employed. E.g. fast changing parts of the spectrum may be reported by fast reports with a small reporting period while slowly changing parts of the spectrum may be reported less often, thus having an increased reporting period.

This scheme may require reallocation of frequency parts to reports as fast and slowly varying frequency parts may be considered to be dynamically changing over the spectrum.

A further lossless scheme may be adapting the reporting period to the fastest varying frequency part.

The dynamic reallocation of fast varying frequency parts over the frequency band may be provided, e.g. for a certain frequency part of physical resource block, the reporting period may be relevant with regard to receiving accurate channel-dependent information, while other frequency parts may be considered to be stable.

A further scheme may be seen to provide partial self-contained reports.

While a full self-contained feedback may comprise considerable overhead with respect to achievable performance, in the following self-contained report schemes are provided in which the overhead for self-containment may be adapted. In case of reduced overhead there may be a performance degradation for a certain period of time. Thus, one may take into account the performance degradation that may be allowable for a certain period of time for determining the amount of overhead required to provide for that kind of performance degradation. Temporary performance degradation may also be addressed by increasing HARQ retransmission rates.

The performance degradation may be limited to a certain degree by different partial self-containment schemes like fallback to the last error-free received tracking report, cyclic reporting of coarse information of a channel-dependent attribute, employing fountain codes like erasure code or raptor code and providing relative coarse information of a channel-dependent attribute.

The schemes presented may also be combined, e.g. adaptive reporting periods may be combined with self-contained coarse reports or reduction of overhead of additional tracking feedback, due to the fact that a combination of several self-contained reports may provide increased channel-dependent information accuracy.

It may be preferred to employ quantized amplitude values and phase values with certain, defined or preset quantization levels for reporting. Since according values may be considered to reflect the physical properties of the radio channels, no real discontinuities between two subsequent reports may occur. Accordingly, continuous amplitude values and phase values may be further preferred for tracking schemes. E.g. amplitude values may remain substantially uniform for a prolonged time period. Amplitude values may not require general, e.g. unitary precoding codebooks with which codebooks subsequent reports may define an arbitrary codebook entry, even in case of only minor changes of the radio channel, due to the amplitude value remaining substantially stable.

The degree of self-containment may be adjusted depending on the overall communication scheme by adjusting according parameters. Parameters may e.g. be the number of bits available for coarse information and how often coarse information or tracking information is transmitted.

Again, short-term performance degradations may be addressed by HARQ retransmissions.

In case of joint precoding, only those mobile communication devices of which a tracking report has failed, may be affected by degradation of channel-dependent information. Other mobile communication devices, e.g. of the same cooperation area, may be unaffected. Accordingly, mobile communication devices situated at the border of a communication cell, possibly having diminished upload conditions with an according high probability of report failure may not degrade other communication connections of the same cooperation area.

Self-containment may be increasingly important with an increase in tracking periods. This may be due to reports being missed shortly after a full report may fall back to the last full report when employing delta reports, however changes increase with an increase in reporting period, thus more than average changes may have to be reported with an increase in reporting period, seen from the last full report in particular.

Accordingly, it may be conceivable to increase reporting container size for delta reports of channel-dependent information from the beginning to end of a tracking period in a predefined way, e.g. first n reports may comprise 80 bits, n+1–2n reports comprise 90 bits and 2n+1–3n reports comprise 100 bits. Physical Downlink Control Channel messages (PDCCH) may be provided to adapt reporting schemes or to exchange self-containment capability of the mobile communication devices.

Delta reporting may thus allow reducing reporting overhead, e.g. in low mobility coordinated multipoint transmission scenarios. A further lossless compression, e.g. zip encoding, may provide for further reduced reporting overhead or may allow to increase reported data without an increase in transmitted data, e.g. of up to 500% to 800%.

Full reports scheduled at predefined intervals may allow for resynchronization between a mobile communication device and a network node, e.g. after a missed tracking report. Self-contained tracking may provide a robust tracking method with regard to transmission errors, possibly requiring an increased overhead.

Different partial self-contained tracking reporting schemes may allow reducing reporting overhead compared to reporting overhead required for fully self-contained reports with accordingly robust coordinated multipoint transmission precoding. Partial self-containment may be seen as falling back to reduced performance, thus reduced channel-dependent information accuracy, in case a tracking error occurs, successively increasing channel-dependent information accuracy afterwards to full accuracy. Partial self-containment provides an increase in robustness compared to pure tracking reports due to a reduction of error propagation effects. Thus, reporting overhead is increased to allow tracking reporting, e.g. even in case of high block error rates target, to provide robust coordinated multipoint precoding with only short-term performance degradation.

According schemes may be seen to change relative phase for subsequent coarse reports to increase accuracy of phase values when combining multiple subsequent reports. Also, a fallback to previous tracking report may be conceivable, in particular in case of low block error rate targets, thus creating no additional overhead. Adding coarse channel-dependent information to each tracking report may lead to a very robust tracking reporting. Fountain coding coarse channel-dependent information for tracking reports may be conceivable, thus distributing channel-dependent information over several reports for reduction of overhead.

Also, a change value being indicative of the current channel-dependent information with respect to the last full report may be including in a tracking report. This may allow to construct currently relevant channel-dependent information for each tracking report. An according tracking scheme may be considered to be fully self-contained while in case of low channel variation additional overhead is minimized.

The change value may be indicative of a change in channel-dependent information with respect to a previously received delta report, which in turn may depend on a further relative or full report, thus providing coarse channel-dependent information that may be constant for a prolonged time. The change value may depend on the preceding relative channel-dependent information, thus tracking report, which scheme may continue until the last full report. Instead of full reports, at least instead of full reports transmitted after the first full report, fountain-coded coarse or fountain-coded coarse plus fine channel-dependent information for a defined period of time may be provided.

Also, different reporting periods for coarse and fine channel-dependent information values may be conceivable, thus saving overhead with regard to full reports, with coarse and/or fine channel-dependent information values being extractable at any given reporting time.

Relative information of a channel dependent attribute may be depending at least in part on the absolute information of a channel dependent attribute and/or at least one preceding relative information of a channel dependent attribute.

As a logical data unit, any logical unit may be understood, which may be employed for containing and/or transmitting data, e.g. in a communication between at least two communication entities, e.g. a mobile communication device and a network node. A logical data unit may in particular have no distinct dependence or relation to frequency or time, thus may in particular be not frequency dependent or time dependent.

One example of a logical data unit however may e.g. be a frame or a subunit of a frame of a communication connection, e.g. according to 3GPP LTE.

In the following, further embodiments of the present invention are described referring in particular to a mobile communication device as well as a network node.

However, arbitrary variations and interchanges of single or multiple features between the claimed entities is conceivable and within the scope and disclosure of the present patent application.

According to a further exemplary embodiment of the present invention, the self-containment information of a channel-dependent information may be adapted for at least partial reconstruction of at least one information out of the group consisting of information of a channel-dependent attribute, absolute information of a channel-dependent attribute and relative information of a channel-dependent attribute.

Self-containment information may allow to reconstruct channel-dependent information, e.g. in case that a preceding transmission comprising channel-dependent information was transmitted errorously, e.g. was not received at all, and thus the channel-dependent information currently available e.g. at a network node, may not correspond to channel-dependent information currently required for a preferred communication over the communication channel.

According to a further exemplary embodiment of the present invention, the mobile communication device may further comprise a processing unit, wherein the processing unit may be adapted to generate at least one of a relative information of a channel-dependent attribute and a self-containment information of a channel-dependent attribute from at least one of absolute information of a channel-dependent attribute and preceding relative information of a channel-dependent attribute.

The mobile communication device, with its processing unit, may be adapted to generate current tracking and/or self-containment information for subsequent transmission over the communication channel to e.g. a network node. The network node in turn may employ the so generated information for a preferred communication with the mobile communication device.

According to a further exemplary embodiment of the present invention, the self-containment information of a channel-dependent attribute may comprise at least one out of the group consisting of full self-containment, full self-containment with increasing accuracy of information of a channel-dependent attribute, providing coarse and fine information of a channel-dependent attribute, sigma-delta modulation, providing absolute information of a channel-dependent attribute with adaptive reporting period, partial self-containment, cyclic reporting of coarse information of a channel-dependent attribute, fountain code, erasure code, raptor code and providing relative coarse information of a channel-dependent attribute.

Providing self-containment information may allow to optimally utilize, e.g. a reporting capacity of a communication channel, depending on the physical conditions of the communication channel. For example, in case a stable connection may be considered more important than communication channel capacity, the amount of self-containment information may be adapted to provide a communication channel with increased stability. In case a communication channel with low error rate is present, self-containment information may be reduced for an increase in data transmission capacity of the communication channel.

According to a further exemplary embodiment of the present invention, the information of a channel-dependent attribute may be adapted to comprise at least one out of the group consisting of channel state information, channel state information of a communication channel and channel state information of at least one further mobile communication device arranged such that the further mobile communication device may influence the transmission of the mobile communication device.

Channel-dependent information of all or at least a subgroup of mobile communication devices associated with a cooperation area may be considered by the network node, possibly being to the mobile communication device for a preferred communication connection, possibly reducing interference with adjacent mobile communication devices by considering their respective channel-dependent information. Multiple network nodes, e.g. of a CA, may share channel dependent information of at least a subgroup of the mobile communication devices associated to the CA.

According to a further exemplary embodiment of the present invention, the relative information of a channel-dependent attribute may be one out of the group consisting of tracking information and delta information.

For a reduction in overhead, it may be beneficial to not provide full or absolute channel-dependent information but rather only relative information, e.g. information that was changed or information about how the channel has been changed with regard to the last full or absolute report and/or the or a preceding relative information.

According to a further exemplary embodiment of the present invention, the first logical data unit comprises at least one out of the group consisting of a physical resource block and a half physical resource block.

According to a further exemplary embodiment of the present invention, the transmission may be one transmission out of the group consisting of Long Term Evolution transmission, Long Term Evolution Advanced transmission, Long Term Evolution Advanced multiple user multiple input multiple output transmission and Long Term Evolution Advanced single user multiple input multiple output transmission.

According to a further exemplary embodiment of the present invention, the network node may further comprise a processing unit, wherein the processing unit may be adapted for at least partial reconstruction of channel-dependent information of a data unit provided to the network node by employing at least one information out of the group consisting of absolute information of a channel-dependent attribute, relative information of a channel-dependent attribute and self-containment information of a channel-dependent attribute. An according processing may enable the network node to reconstruct channel-dependent information, at least a part of the channel-dependent information e.g. coarse channel-dependent information even in case an intermediate tracking report has been missed thus, was not received.

According to an exemplary embodiment of the present invention, a mobile communication device is provided, comprising a sending and receiving unit, wherein the sending and receiving unit is adapted for transmission of a signal pattern over a communication channel. The signal pattern may comprise a frame structure having at least two logical data units. The signal pattern further comprises information of a channel-dependent attribute. In a first logical data unit, absolute information of a channel-dependent attribute is provided wherein in at least one second logical data unit, relative information of a channel-dependent attribute is provided. The relative information of a channel-dependent attribute ma be depending at least in part on the absolute information of a channel-dependent attribute and/or a preceding relative information of a channel-dependent attribute. The at least one second logical data unit further comprises self-containment information of a channel-dependent attribute.

According to a further exemplary embodiment of the present invention, a network node is provided, comprising a sending and receiving unit, wherein the sending and receiving unit is adapted for the transmission of a signal pattern over a communication channel. The signal pattern may comprise a frame structure having at least two logical data units. The signal pattern further comprises information of a channel-dependent attribute. In a first logical data unit absolute information of a channel-dependent attribute is provided, wherein in at least one second logical data unit relative information of a channel-dependent attribute is provided. The relative information of a channel-dependent attribute may be depending at least in part on the absolute information of a channel-dependent attribute and/or a preceding relative information of a channel-dependent attribute. The at least one second logical data unit further comprises self-containment information of a channel-dependent attribute.

According to a further exemplary embodiment of the present invention, a communication system is provided, comprising at least one mobile communication device according to the present invention and at least one network node according to the present invention, wherein the at least one mobile communication device and the at least one network node are operatively coupled for the transmission of a signal pattern.

According to a further exemplary embodiment of the present invention, a method for providing channel-dependent information is provided, comprising determining by a determination unit, a channel-dependent attribute of a transmission between a mobile communication device and a network node, generating, by a processing unit, self-containment information of the channel-dependent attribute, transmitting the self-containment information of a channel-dependent attribute by a sending and receiving unit, wherein the self-containment information of a channel-dependent attribute is adapted for at least partly reconstruction of at least one information out of the group consisting of information of a channel-dependent attribute, absolute information of a channel-dependent attribute and relative information of a channel-dependent attribute.

According to a further exemplary embodiment of the present invention, a method for receiving channel-dependent information is provided, comprising receiving by a sending and receiving unit a logical data unit of a transmission of a signal pattern, the logical data unit comprising at least one information out of the group consisting of absolute information of a channel-dependent attribute, relative information of a channel-dependent attribute and self-containment information of a channel-dependent attribute and reconstructing by a processing unit at least a part of the channel-dependent information of the transmission by at least one information out of group consisting of absolute information of a channel-dependent attribute, relative information of a channel-dependent attribute and self-containment information of a channel-dependent attribute.

These and other aspects of the present invention will become apparent from and elucidated with reference to the embodiments described hereinafter.

Exemplary embodiments of the present invention will be described in the following with reference to the following drawings.

The illustration in the drawings is schematic. In different drawings, similar or identical elements are provided with similar or identical reference numerals.

BRIEF DESCRIPTION OF THE DRAWINGS

FIG. 3 shows exemplary embodiments of tracking information according to the present invention, FIGS. 4A,B show an exemplary comparison of self-contained phase reporting versus coarse and fine reporting according to the present invention, while FIGS. 4C, D show examples where reports are extended to a reporting scenario with $N_C=2$ coarse bits and $N_F=2$ fine bits, FIGS. 5A,B show an exemplary embodiment of a fallback scenario according to the present invention, FIGS. 6A-E show exemplary embodiments of providing self-containment information in tracking reports according to the present invention.

DETAILED DESCRIPTION OF EMBODIMENTS

Figure 1A:
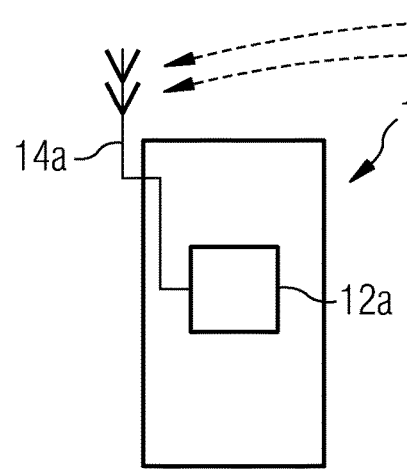
FIGS. 1A,B show exemplary embodiments of a mobile communication device and a network node according to the present invention.

Now referring to FIGS. 1A,B, exemplary embodiments of a mobile communication device and a network node according to the present invention are depicted.

FIG. 1A shows an exemplary embodiment of a mobile communication device 10 comprising a processing unit 12a and a sending and receiving unit 14a. The mobile communication device 10 may be an arbitrary mobile communication device like e.g. a cellular phone, a personal digital assistant, a portable computer or the like. The mobile communication device 10 may further comprise a keyboard, e.g. a numerical or alphanumerical keyboard, a display, a speaker and a microphone, all of which are not displayed in FIG. 1A.

The processing unit 12a is coupled with the sending and receiving unit 14a for the transmission, thus sending and receiving of data, information or a signal pattern over a communication link or communication connection 16 to a further device adapted for receiving the transmission from mobile communication device 10.

Figure 1B:
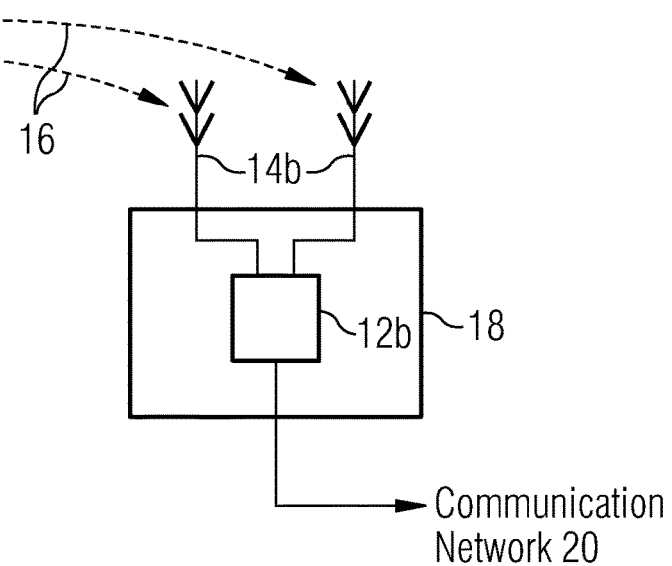

FIG. 1B shows an exemplary embodiment of a network node 18, e.g. the base station of a cellular communication network, here exemplary comprising two sending and receiving units 14b. Both sending and receiving units 14b are connected to a processing unit 12b, which in turn is connectable to a communication network 20.

Two communication connections 16 or radio channels between the mobile communication device 10 and the network node 18 are provided. Each communication connection 16 or radio channel may comprise an individual channel-dependent attribute, e.g. individual channel-dependent information. The mobile communication device 10 may thus be connected to the communication network 20 for the transmission of data over the communication connections 16 and the network node 18.

Figure 2:
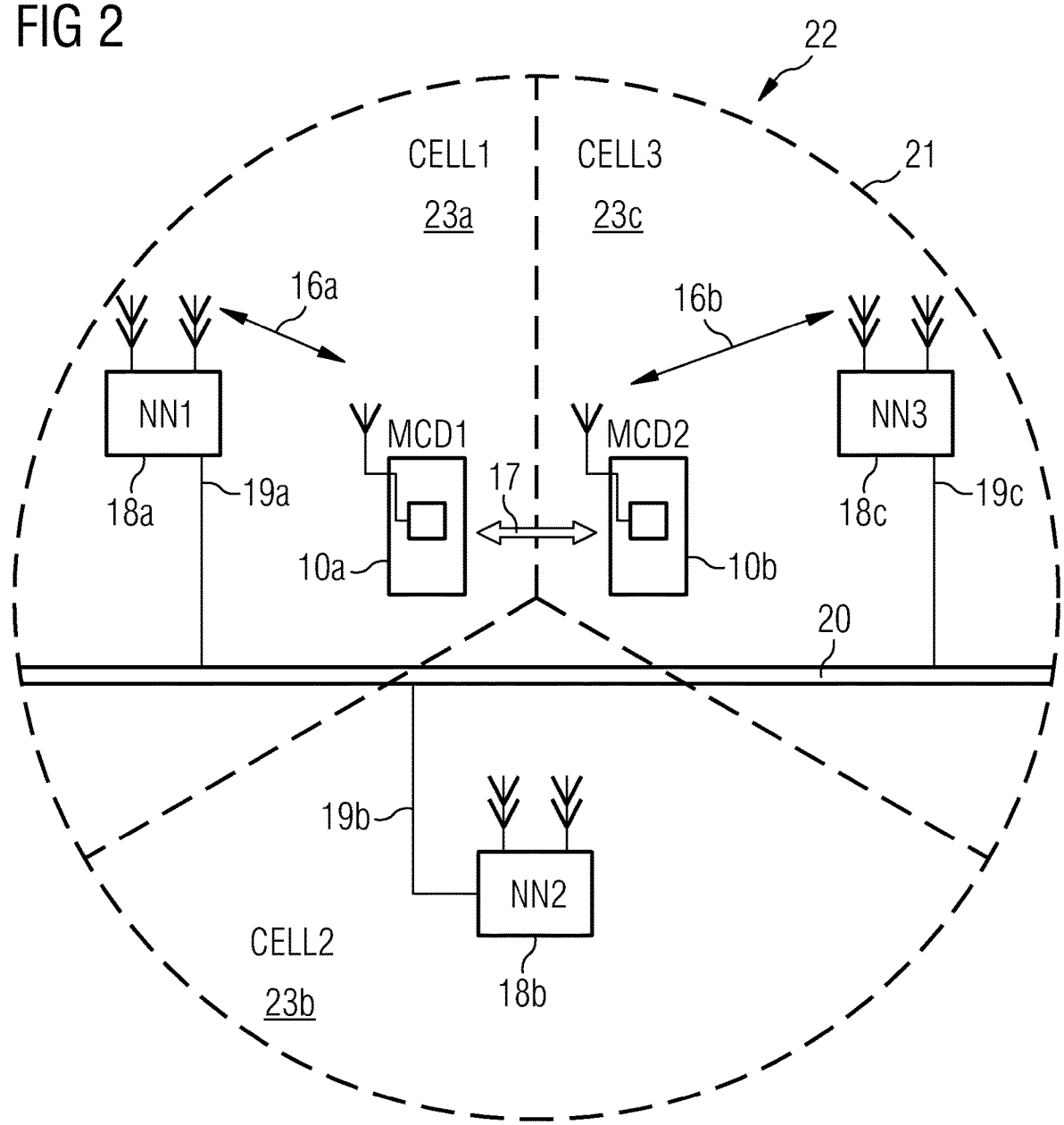
FIG. 2 shows an exemplary embodiment of a communication network comprising three network nodes and two mobile communication devices in a coordinated multipoint transmission scenario according to the present invention.

Now referring to FIG. 2, an exemplary embodiment of a communication network comprising three network nodes and two mobile communication devices in a coordinated multipoint transmission scenario according to the present invention is depicted.

In FIG. 2, an exemplary embodiment of a communication system 22 comprising a cooperation area 21 is shown. The cooperation area 21 comprises three wireless communication cells 23a,b,c. In each cell 23a,b,c, network node 18a,b,c are arranged and associated with the respective cell 23a,b,c. A communication network 20 is provided, here exemplary as a central backbone of a communication network 20, to which the network nodes 18a,b,c are connected to over communication links or communication connections 19a,b,c, which may be wireless or wired.

In the cooperation area 21 exemplary two mobile communication devices 10a,b are arranged and in communication with network node 1 18a and network node 3 18c respectively.

Mobile communication device 1 10a is communicatively coupled with network node 1 18a over communication connection 16a and mobile communication device 2 10b is communicatively coupled with network node 3 18c over communication connection 16b.

To provide channel-dependent information of all communication connections 16a, 16b to all network nodes 18a,b,c, each mobile communication device may either perform a multicast message, which possibly is received by all network nodes 18a,b,c or one distinct network node, e.g. network node 1 18a in case of mobile communication device 1 10a, which may provide channel-dependent information over communication connection 19a to the communication network 20, possibly also as a multicast message, which may be received over communication connections 19b,c by network node 2 18b and network node 3 18c.

Each mobile communication device 10a,b provides channel-dependent information, like channel state information, to the network node 18a,c it is associated with over communication connections 16a, 16b. E.g., mobile communication device 10a may provide channel-dependent information by both full reporting and delta reporting. In case e.g. a tracking report sent from mobile communication device 10a to network node 18a was not received by network node 18a, e.g. due to interference 17 of a nearby communication device 2 10b, mobile communication device 1 10a and network node 1 18a may be out of sync with regard to channel-dependent information.

Now referring to FIG. 3, exemplary embodiments of tracking information according to the present invention are depicted.

FIG. 3 shows exemplary delta reports per sub-frame from a mobile communication device with low mobility, e.g. a mobile speed of up to 3 km/h. A "0" may be interpreted as channel state information or channel-dependent information like phase or amplitude values that are not changed, while a "+/−1" may be seen as channel-dependent information that has changed by one quantization step up or down.

The reports of FIG. 3 may exemplary be one Long-Term Evolution communication frame with ten 1 ms sub-frames for 20 physical resource blocks. Thus, nine change values have been provided in the delta reports according to FIG. 3, each referring to a delta change relative to the preceding value. Accordingly, for ten consecutive sub-frames, nine delta values have been provided per physical resource block.

Figure 4A:
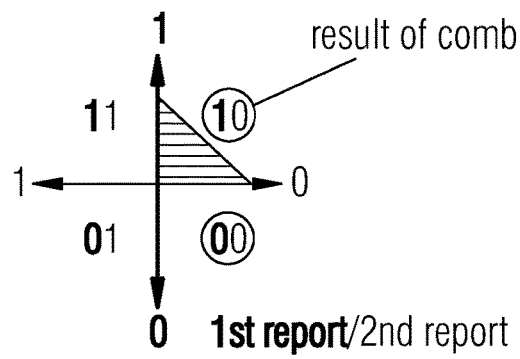

Now referring to FIGS. 4A,B, an exemplary comparison of self-contained phase reporting versus coarse and fine reporting according to the present invention is depicted.

In FIG. 4A, two self-contained reports, here exemplary phase reports, with 1 bit each are depicted. Due to the orientation of each self-contained report, horizontal versus vertical, each self-contained report reflects different parts of the channel-dependent information, channel state information or phase. The orientation of the reports and in particular a change in orientation may be predefined, e.g. for obtaining additional information.

Thus, when being combined by a receiving unit, both reports increase channel-dependent information accuracy or channel state information granularity, thus obtaining channel state information with increased accuracy compared to a single report.

In FIG. 4A, exemplary two reports have been provided that send a "1" followed by a "0". This may allow the network node to estimate the channel-dependent information or channel state information to be within the shaded area, thus the accuracy may be seen as having increased from 180° to 90°. A single bit of either report may only signal two of the four depicted quadrants, with the successive bit also indicating two of the four quadrants. Accordingly, the common quadrant of the four quadrants, shared by both reports, thus identified by both bits may be seen as the resulting quadrant having not 180° but 90°. Accordingly, accuracy was increased by the second report over the first report.

Figure 4B:
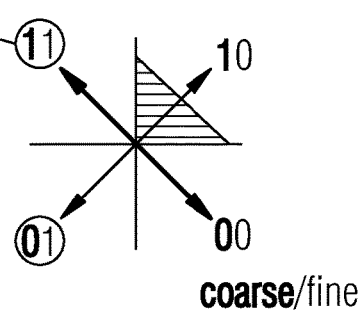

With regard to FIG. 4B, coarse/fine reporting is depicted. In a first report, one bit coarse data reports ($N_C=1$) with one bit fine data reports ($N_F=1$) are combined. The accuracy achievable is comparable to the accuracy of FIG. 4A. Tracking reports may be seen as coarse and fine reporting schemes. The first full report may be considered to provide coarse and fine data with successive tracking reports providing further fine data. In FIG. 4B, again two reports are each indicating an area of 180° of a possible area of 360°. The common, shared quadrant, thus an area of 90°, is the result of a combination of the coarse and fine reports.

Figure 4C:
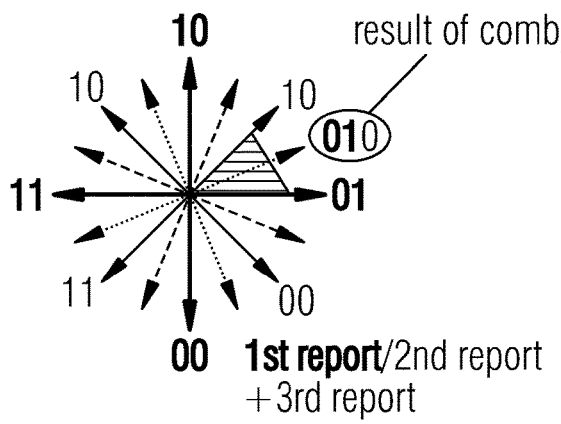
Figure 4D:
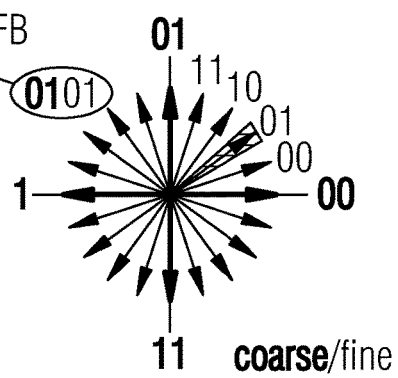

With regard to FIGS. 4C and 4D, reports are extended to a reporting scenario with $N_C=2$ coarse bits and $N_F=2$ fine bits.

FIG. 4C shows self-contained reporting with an identical number of bits, e.g. 2 bits, for both reports. The achievable accuracy of channel-dependent information after the combination of both reports is equivalent of 45°, as may be taken from the shaded area. Thus, an according reporting scheme may be interpreted as being equivalent to one report comprising 3 bits. Each further report comprising 2 bits may be seen as adding one further bit with regard to accuracy of the combined report.

In FIG. 4D, a reporting scheme comprising coarse and fine reporting is depicted. The achievable accuracy in case of FIG. 4D is 2 bits+2 bits=4 bits or an area of 22.5° for two reports. In case of FIG. 4D, two further bit fine reports may increase the accuracy by 2 bits.

Generally speaking, n bits reporting accuracy provide $2^n$ different possible values or states. Thus, an area of 360° may be divided in $360°/2^n$ different areas or values. E.g. as indicated above when employing 4 bits, a resolution of 22.5° is obtainable, equaling to $360°/2^4=360°/16$ distinct values.

Thus, FIG. 4A to FIG. 4D provide self-contained reporting with increasing accuracy per report. In case a report is missed, channel-dependent information may be reconstructed as fallback with lower accuracy, either to the accuracy of the self-contained report itself or with increased accuracy by combining a plurality of error-free received self-contained reports.

The phase orientations of the self-contained reports may have to be predefined for all reports. With regard to $N_C=1$ and $N_F=1$, the achievable accuracy when employing self-containment is identical to coarse/fine reporting. Thus, in this case, self-containment may be provided without increasing overhead.

In case of self-contained reporting comprising more than 1 bit per report, the accuracy achievable by self-contained reports may be half of the accuracy achievable by coarse/fine reporting, e.g. in case of $N_C=2$ and $N_F=2$.

Now referring to FIGS. 5A,B, an exemplary embodiment of a fallback scenario according to the present invention is depicted.

In FIG. 5A, exemplary a tracking report has been missed or lost either by an errorous transmission or by an overflow occurring. Here, an overflow may be seen as the value for channel variation that would have to be transmitted by the delta report or tracking report being larger than the capacity for an according delta signalling. E.g. in case the channel variation requires 3 bits for signalling a change in the order of $2^3=8$ quantization steps, a report having only a capacity or 2 bits may overflow.

In case a tracking report has been lost, according to FIG. 5B, it may be conceivable to fall back to the last error-free received tracking report. In case there has been no change to the channel-dependent information values, an according fallback may lead to only minor or even no errors, in particular if the tracking range may be considered to be small. With the next received full report, the reporting scheme thus the mobile communication device and the network node are again synchronized.

Now referring to FIG. 6A-E, exemplary embodiments of providing self-containment information in tracking reports according to the present invention are depicted.

Figure 6A:
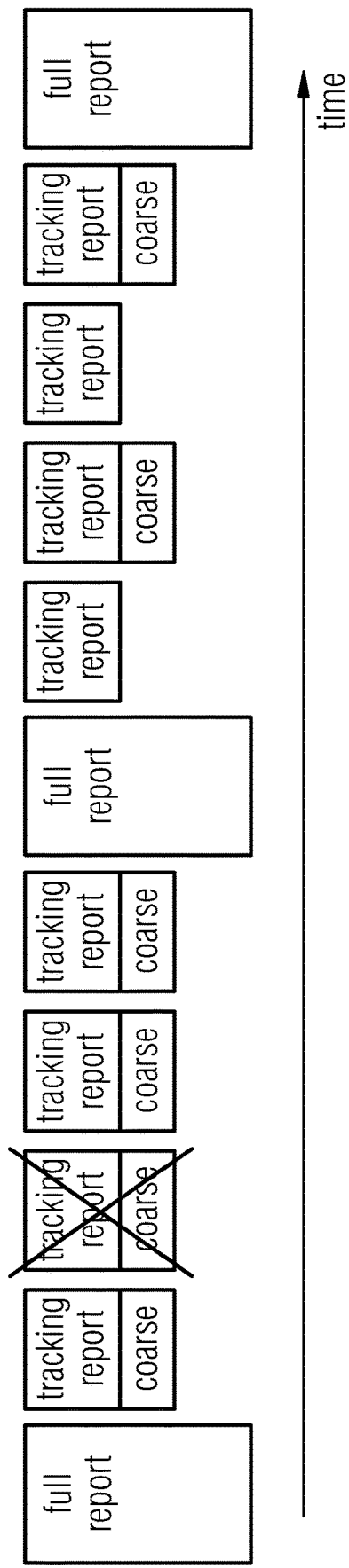

With regard to FIG. 6A, coarse channel-dependent information is provided in a regular reporting period, e.g. every single or every n-th like every 2nd, tracking report. An according reporting scheme may be seen as being similar to self-contained tracking. It may be conceivable to further separate coarse and fine tracking, e.g. providing coarse tracking information regularly, like every or every n-th report and including further tracking reports for fine value variation.

This may allow falling back to coarse quantization levels in case a report has been missed, which is particularly beneficial in case of large block error rate targets. The tracking information may be considered to be errorous, thus there may be performance degradation to some degree for a time period, e.g. until the next full report is received, however the system may still be operable.

An according coarse plus fine tracking report may increase reporting overhead, e.g. in case coarse information of a channel-dependent attribute is added to the regular tracking report feedback for each report. The overhead may be reduced by e.g. providing coarse feedback only every n-th report, e.g. only every second report.

Figure 6B:
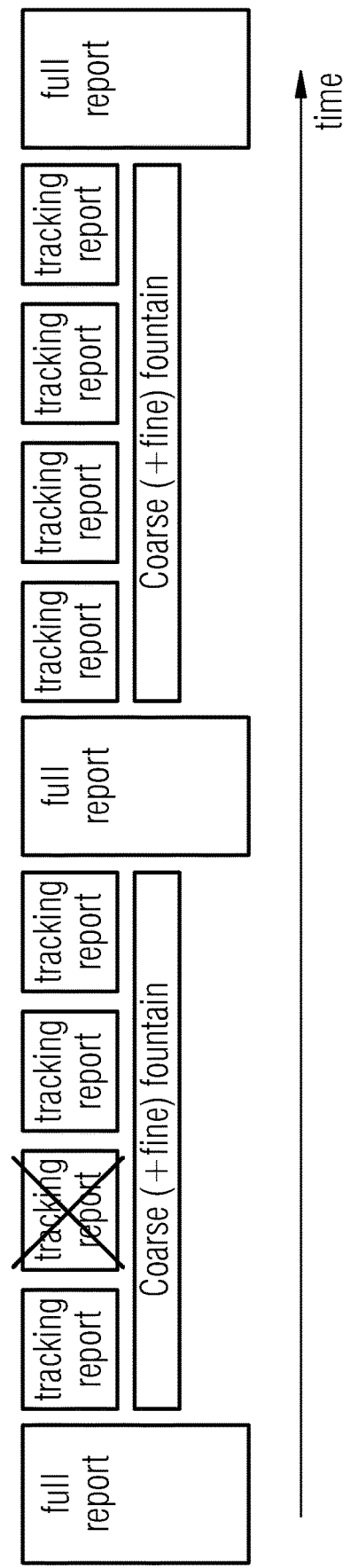

With regard to FIG. 6B, fountain codes like erasure code or raptor code are employed to distribute coarse reports over several tracking reports. By employing according fountain coding, the overhead per tracking report may be further reduced. Furthermore, fountain codes may be considered to be very robust. With an according fountain coding, a full message may be reconstructed even in case only some reports have been received, as fountain coding allows for an according reconstruction, e.g. of coarse and/or fine information.

With regard to FIG. 6C, it may be conceivable to not always report absolute coarse information but however also tracking coarse information, thus relative coarse information. Coarse channel-dependent information, intended as a fallback solution, may be changing quite slowly, thus, it may not be necessary to include full coarse channel-dependent information in each report as an absolute value. Instead, it may be conceivable to add delta coarse information or tracking coarse information, indicating changes between the coarse information of the last full report and the current coarse information.

In case no or only minor variations in the coarse channel-dependent information between full reports is occurring providing tracking coarse channel-dependent information, e.g. per tracking report, may result in only a minor additional overhead. In a best case scenario, only a "no change" value, indicating that no change in coarse information has occurred since the last full report, may be required. Providing delta coarse information with variable reporting periods for different quantization levels, e.g. of coarse tracking information, may be conceivable as well.

With regard to FIG. 6D, an offset value is employed for providing an offset with regard to reported coarse information. It may be beneficial to provide coarse report in such a way as to assure that coarse reporting information, at least the most significant part of the coarse report information, is valid as long as possible, preferably until the next full report. Thus, an offset may be employed in a full report to change quantized channel-dependent information values by the offset such that the most significant bits of the quantized channel-dependent information values do not change for a prolonged time, preferably until the next full report. However, the offset may has to be reported in the full report as well.

In the left picture element of FIG. 6D, when the depicted waveform indicating a change in channel-dependent information is varying, it may either have a most significant bit of 1 as well as a most significant bit of 0 during its fluctuation. By employing an offset, the most significant bit or even the most significant two bits substantially remain "1" with regard to the right picture element of FIG. 6D.

With regard to FIG. 6E, also employing continuing fountain coding for coarse and possibly fine information after a first full report, without further full reports being required, is conceivable. Successive full reports are replaced by fountain coded coarse and possibly fine information. After, possibly predefined, time periods, the channel-dependent information for which the relative tracking reports are generated, may be adapted to current channel conditions. In case new channel-dependent information as coarse and possibly fine information has to be provided, the fountain may be changed. Thus, in FIG. 6E, three different fountains, i.e. fountain 1, fountain 2, fountain 3, are depicted.

This scheme may allow avoiding further full reports besides the first full report and may be considered to combine self-contained reporting with coarse channel-dependent information being able to be reconstructed by employing fountain coding. Thus, further full reports may not be required, allowing to employ tracking reports with reduced feedback overhead, in particular by not requiring further full reports of a possibly larger size. Coarse reports may be delta coarse reports as well, which may again be fountain coded.

Figure 7:
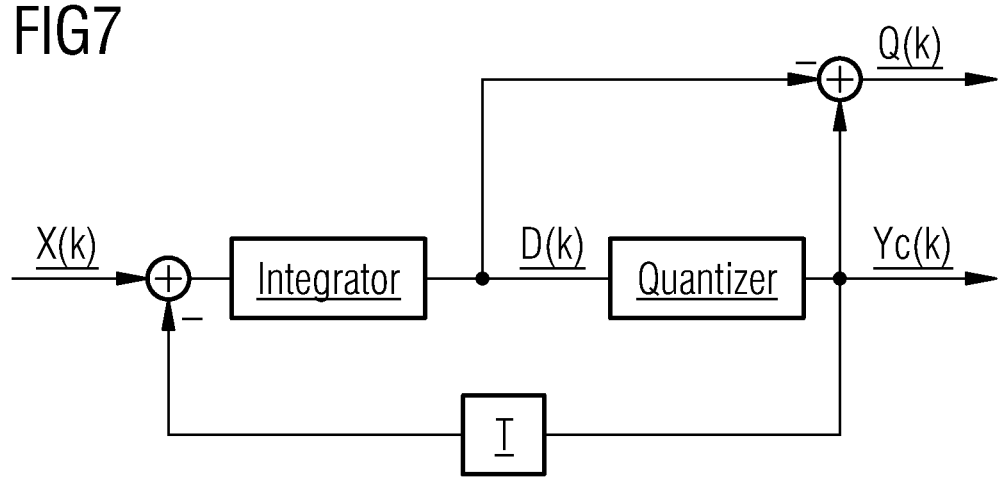
FIG. 7 shows an exemplary embodiment of sigma-delta modulation according to the present invention, and FIG. 8A,B show exemplary embodiments of a method for providing channel-dependent information and a method for receiving channel-dependent information according to the present invention.

Now referring to FIG. 7, an exemplary embodiment of a sigma-delta modulation according to the present invention is depicted.

Sigma-Delta Modulation (SDM) may be employed to compute a sequence $Y_c(k)$ from an input sequence $X(k)$ such that the n bits (n>=1) in the sequence/value $Y_c(k)$ denote an estimate of the most-significant n bits of the value $X(k)$. The quantization step size $S_q$ used in the Quantizer of FIG. 7 and a normalization factor for input signal $X(k)$ have to be selected appropriately.

FIG. 7 shows an exemplary embodiment of a Sigma-Delta modulator. The output signal of the integrator $D(k)$ provides the difference between the integration result of sequence X (up to the time instance k) and the integration result of sequence $Y_c$ (up to time instance k−1). The SDM will converge in case the update rate (step size of $S_q$ of the Quantizer over update period T) of the SDM is high compared to the maximum derivation of the input signal $X(k)$. In other words, the SDM will reach a steady-state behaviour for $k > k_0$ and with equation 1

$$(X(k)+X(k+1)+ \ldots +X(k+M-1))-(Yc(k)+Yc(k+1)+ \ldots +Yc(k+M-1))=-Q(k+M-1)+Q(k-1) \quad \text{Equation 1}$$

the following inequality 1 holds true for all $k > k_0+1$ and data windows of length M.

$$\text{Abs}(-q(k+M-1)+Q(k-1)) \leq 2Sq \quad \text{Inequality 1}$$

An improved estimate $X_W$ for $X(k)$ may be obtained by averaging when $X=X_W$ for all samples X in the data window of length M, at least with $X \approx X_W$.

$$Xw = \frac{(Yc(k) + Yc(k+1) + \ldots + Yc(k+M-1))}{M} - \frac{(Q(k+M-1) - Q(k-1))}{M} \quad \text{Equation 2}$$

An implementation of the receiving unit may perform filtering instead of averaging, which takes into account reliability information for received samples $Y_c(k)$ and the bandwidth of the input sequence $X(k)$.

The SDM scheme may be combined with fine reports, which may contain quantization errors $Q(k)$ in addition to the coarse estimates $Y_c(k)$.

The receiver may thus reconstruct the input sequence $X(k)$ by applying M=1 in equation 1.

$$X(k)=Yc(k)-Q(k)+Q(k-1) \quad \text{Equation 3}$$

Tracking reports for data reduction may not be directly applicable to $Q(k)$, since the quantization noise does not contain any dominant constant component with noise shaping in SDM possibly removing a constant component.

However, sequence $Q(k)$ may be reconstructed in the receiving unit, e.g. a network node, when the fine reports contains the ordinary tracking information $x(k)=X(k)-X(k-1)$.

Then the receiver may obtain $Q(k)$ by performing a SDM processing step based on the prediction $X_p(k)=X(k-1)$ for the sample $X(k)$. The SDM processing step in the receiving unit may provide prediction values $Y_p(k)$ and $Q_p(k)$ for $Y_c(k)$ and $Q(k)$ of the SDM processing step in the sending unit, e.g. a mobile communication device. This may require the structure and the parameters of the SDM unit employed in the sending unit to be known by the receiving unit.

The value X(k−1) may be determined from information available in the receiver from previous reports ($Y_c(k<0)=Q(k<0)=0$).

$$X(k-1)=Yc(k-1)-Q(k-1)+Q(k-2)=Xp \qquad \text{Equation 4}$$

The SDM processing step in the receiving unit with input data $(X_p(k),Q(k-1))$ provides output data $(Y_p(k),Q_p(k))$, while the SDM processing step in the sending unit for the same time instance with input data $(X(k)=X_p(k)+x(k),Q(k-1))$ results in output data $(Y_c(k),Q(k))$.

Based on the reported samples $Y_c(k)$ and x(k) as well as the results of its prediction step, the receiving unit may determine a reconstructed value $Q_r(k)$ for the quantization error Q(k) in the sending unit according to equation 5.

$$Qr(k)-Yc(k)-Yp(k)+Qp(k)-x(k) \qquad \text{Equation 5}$$

$Q_r(k)=Q(k)$ will hold true in case $Y_c(k)$ and x(k) have been correctly received and $Q_r(k-1)=Q(k-1)$ was valid, i.e. the procedure may not automatically recover from an incorrectly reconstructed sample Q(k).

For recovery from an error state, the sending unit may have to transmit the state information of its SDM, e.g. the output values of the integrators in the SDM unit. In case of the SDM, which may be considered to be a first order SDM, this may be equivalent to transmitting the quantization error Q(k).

Another option may be to perform a coordinated restart of the SDM units in the sending unit and the receiving unit. The fine report may then indicate x(k)=X(k), i.e. the sender may provide a full report for the affected subcarrier.

Thus, the sending unit may provide estimates of an input sequence X(k) for self-contained reporting through SDM. The receiver may improve the accuracy of the estimate by filtering.

The coarse estimation results may recover from a corrupt or lost report when the corrupt samples are shifted out of the filtering window. The degradation through corrupt samples in the filtering window may be mitigated by taking into account reliability information in the filtering procedure.

Coarse estimation results may be combined with fine reports of the quantization errors to obtain accurate channel-dependent information or CSI. Coarse estimation results may also be combined with tracking reports of the input sequence X(k) for data reduction. This may lead to accurate reports which are no longer self-contained.

The description was carried out for first order SDM but higher order or cascaded SDM may be employed for providing coarse estimates $Y_c(k)$ with improved noise shaping. These coarse estimates may be combined with reports of the quantization errors for accurate estimation results.

Figure 8A:
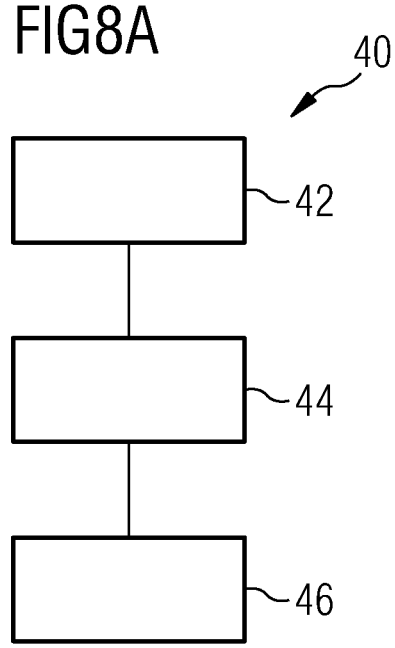

X Input signal of SDM
$Y_c$ Output signal of SDM
$S_q$ Step size of quantizer
Q Quantization error
M length of sequence/data window
x received tracking info
$X_p, Y_p, Q_p$ predicted values generated by receiving unit
$Q_r$ reconstructed value of Q by receiving unit Now referring to FIGS. 8A,B, exemplary embodiments of a method for providing channel-dependent information and a method for receiving channel-dependent information according to the present invention is depicted.

FIG. 8A shows the method for providing channel-dependent information 40, comprising determining 42, by a determination unit, information to be transmitted, in particular a channel-dependent attribute of a transmission between a mobile communication device 10 and a network node 18, generating 44, by a processing unit 12, self-containment information of information to be transmitted, in particular a channel-dependent attribute and transmitting 46 the self-containment information of information to be transmitted, in particular a channel-dependent attribute by a sending and receiving unit 14, wherein the self-containment information of information to be transmitted, in particular a channel-dependent attribute is adapted for at least partial reconstruction for at least one information out of the group consisting of information of information to be transmitted, in particular a channel-dependent attribute, absolute information of information to be transmitted, in particular a channel-dependent attribute and relative information of information to be transmitted, in particular a channel-dependent attribute.

Figure 8B:
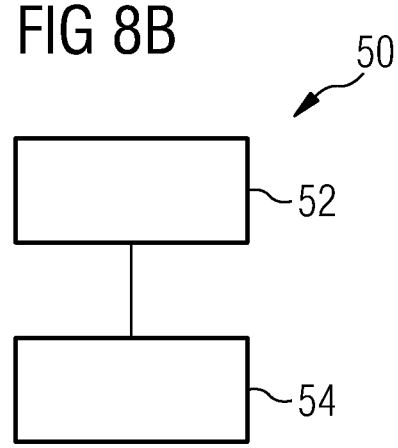

Now referring to FIG. 8B, a method for receiving channel-dependent information is depicted.

The method 50 comprises receiving 52, by a sending and receiving unit 14, a logical data unit of a transmission of a signal pattern, the logical data unit comprising at least one information out of the group consisting of absolute information of information to be transmitted, in particular a channel-dependent attribute, relative information of information to be transmitted, in particular a channel-dependent attribute and self-containment information of information to be transmitted, in particular a channel-dependent attribute and reconstructing 54, by a processing unit 12, at least a part of the information to be transmitted, in particular the channel-dependent information of the transmission by at least one information out of the group consisting of absolute information of information to be transmitted, in particular a channel-dependent attribute, relative information of information to be transmitted, in particular a channel-dependent attribute and self-containment information of information to be transmitted, in particular a channel-dependent attribute.

It should be noted that the term "comprising" does not exclude other elements or steps and that "a" or "an" does not exclude a plurality. Also elements described in association with different embodiments may be combined.

It should also be noted that reference signs in the claims shall not be construed as limiting the scope of the claims.

REFERENCE NUMERALS

10 Mobile communication device
12a,b Processing unit
14a,b Sending and receiving unit
16a,b,c Communication connection
17 Interference
18a,b,c Network node/base station/eNB
19a,b,c Link to communication network
20 Communication network
21 Cooperation area
22 Communication system
23a,b,c Cell
40 Method for providing channel-dependent information
42 STEP: Determining a channel-dependent attribute
44 STEP: Generating self-containment information
46 STEP: Transmitting self-containment information
50 Method for receiving channel-dependent information
52 STEP: Receiving a transmission
54 STEP: Reconstructing channel-dependent information

The invention claimed is:

1. An apparatus comprising:
  a computer readable medium comprising program code;
  at least one processor configured, in response to execution of the program code, to cause the apparatus to perform at least the following:
    transmit a value related to channel state information in reports for coordinated multipoint transmission over a communication channel;

wherein one or more of the reports comprises one or more first information elements of the value and at least one of the reports comprises a second information element of the value, wherein the one or more first information elements comprise relative information of the channel state information and corresponding self-contained bits of the channel state information, and the second information element comprises absolute information of the channel state information;

wherein the reports are self-contained allowing for recovery of at least part of the channel state information for each report; and wherein a coarse reconstruction of the value for controlling a coordinated multipoint transmission is based on the one or more first information elements allowing reconstruction of current channel-dependent information and/or the channel state information in response to transmission of the second information element needed for complete reconstruction of the value being performed but there is a failure of reception of the second information element.

2. The apparatus of claim 1, wherein a combination, by averaging or filtering, of first information elements transmitted in two or more successive reports allows improving accuracy of the coarse reconstruction of the value.

3. The apparatus of claim 1, wherein the first information element comprises an output of a quantizer of a Sigma-Delta Modulator.

4. The apparatus of claim 1, wherein fountain coding is used for distributing the first information element over at least two reports.

5. The apparatus of claim 1, further comprising receiving data that has been precoded based on the coarse reconstruction of the value.

6. The method of claim 1, wherein the corresponding self-contained bits of the channel state information of the relative information reflect different parts of the channel state information, and the self-contained bits of the first information element correspond to orientation on a plane or change in the orientation on the plane, and multiple ones of the one or more first information elements, when combined over time, indicate an area on the plane.

7. An apparatus comprising:

a computer readable medium, comprising program code;

at least one processor configured, in response to execution of the program code, to cause the apparatus to perform at least the following:

receive a value related to channel state information in reports for coordinated multipoint transmission over a communication channel;

wherein one or more of the reports comprises one or more first information elements of the value and at least one of the reports comprises a second information element of the value, wherein the one or more first information elements comprise relative information of the channel state information and corresponding self-contained bits of the channel state information, and the second information element comprises absolute information of the channel state information;

wherein the reports are self-contained allowing for recovery of at least part of the channel state information for each report; and wherein a coarse reconstruction of the value for controlling a coordinated multipoint transmission is based solely on the one or more first information elements from a self-contained report allowing reconstruction of current channel-dependent information and/or the channel state information in response to the second information element needed for complete reconstruction of the value not being received.

8. The apparatus of claim 7, wherein the at least one processor is further configured, in response to execution of the program code, to cause the apparatus to perform at least the following combine, by averaging or filtering, first information elements from two or more successively received reports for improving accuracy of the coarse reconstruction of the value.

9. The apparatus of claim 7, wherein the first information element comprises an output of a quantizer of a Sigma-Delta Modulator.

10. The apparatus of claim 7, wherein fountain coding is used for distributing the first information element over at least two reports.

11. The apparatus of claim 7, further comprising performing precoding of data based solely on the coarse reconstruction of the value and transmitting the precoded data.

12. A method comprising:

transmitting a value related to channel state information in reports for coordinated multipoint transmission over a communication channel;

wherein one or more of the reports comprises one or more first information elements of the value and at least one of the reports comprises a second information element of the value, wherein the one or more first information elements comprise relative information of the channel state information and corresponding self-contained bits of the channel state information, and the second information element comprises absolute information of the channel state information;

wherein the reports are self-contained allowing for recovery of at least part of the channel state information for each report; and wherein a coarse reconstruction of the value for controlling a coordinated multipoint transmission is based solely on the one or more first information elements from a self-contained report allowing reconstruction of current channel-dependent information and/or the channel state information in response to transmission of the second information element needed for complete reconstruction of the value being performed but there is a failure of reception of the second information element.

13. The method according to claim 12, wherein combination, by averaging or filtering, of first information elements transmitted in two or more successive reports allows improving accuracy of the coarse reconstruction of the value.

14. The method according to claim 12, wherein the first information element comprises an output of a quantizer of a Sigma-Delta Modulator.

15. The method of claim 14, wherein the second information element is indicative of quantization error of the Sigma-Delta Modulator.

16. The method according to claim 12, wherein fountain coding is used for distributing the first information element over at least two reports.

17. A method comprising:

receiving a value related to channel state information in reports for coordinated multi-point transmission over a communication channel, wherein one or more of the reports comprises one or more first information elements of the value and at least one of the reports comprises a second information element of the value, wherein the one or more first information elements comprise relative information of the channel state information and corresponding self-contained bits of the channel state information, and the second information element comprises absolute information of the channel state information;

wherein the reports are self-contained allowing for recovery of at least part of the channel state information for each report; and wherein a coarse reconstruction of the value for controlling a coordinated multipoint transmission is based solely on the one or more first information elements from a self-contained report allowing reconstruction of current channel-dependent information and/or the channel state information in response to the second information element needed for complete reconstruction not being received.

18. The method according to claim 17, further comprising combining, by averaging or filtering, first information elements from two or more successively received reports for improving accuracy of the coarse reconstruction of the value.

19. The method according to claim 17,
wherein the first information element comprises an output of a quantizer of a Sigma-Delta Modulator.

20. A non-transitory computer readable storage medium storing program instructions, execution of the program instructions by a processor resulting in the steps of performing the method of claim 12.

* * * * *